Jan. 2, 1951        A. COOKE        2,536,797
ROD CARRIER
Filed June 12, 1948
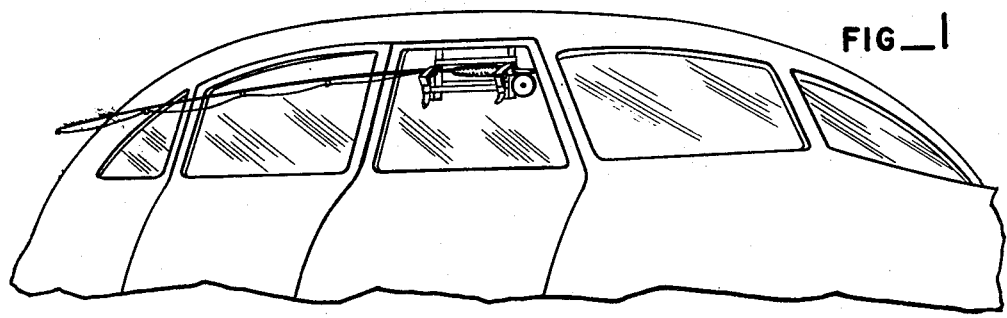
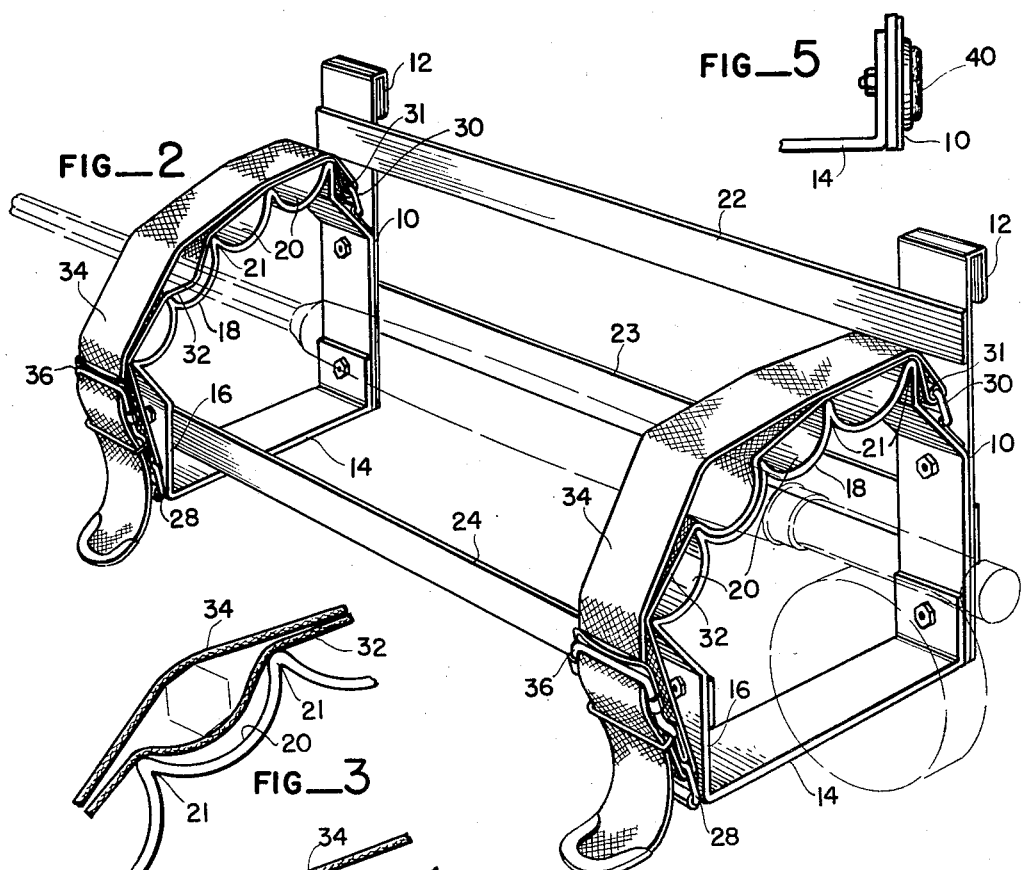
ANSEL COOKE
Inventor
Smith & Tuck
Attorneys Patented Jan. 2, 1951

2,536,797

UNITED STATES PATENT OFFICE 2,536,797

ROD CARRIER

Ansel Cooke, Seattle, Wash.

Application June 12, 1948, Serial No. 32,591

5 Claims. (Cl. 224—42.45)

This invention relates to improvements in a rod carrier and, more particularly, relates to carriers adapted for attachment to automobiles or other vehicles to transport lengthy articles such as fishing rods, and the like, which are ordinarily too long to carry within the body of the vehicle, and which fishermen often prefer to have ready and set up as they move from one fishing spot to another.

Carriers of many types, and particularly those adapted to be hooked over the sill of the automobile body, are known to this art. Because of the complexities in body design that have resulted from streamlining, and the trend toward compactness, it is almost impossible to mount between two widely spaced points on the automobile a holding device that will support fishing rods. Further, it is undesirable to support them from the body because of the scratching that occurs if abrasion takes place; and because of the lowness of the bodies and closeness to the ground, it is not desirable to mount them to the window sill or similar ledges.

Having in mind these and other similar objections, it is in accordance with the present invention to provide a carrier which is adapted to be hooked over the top edge of a window glass so that the carrier is supported high above the ground, is juxtaposed to a glassy surface as distinguished from a painted surface, and consequently is less likely to scratch and mar the automobile finish; is attached to a single door so that the door may be opened or closed without the carrier having to be demounted; and, when the glass is raised to its highest position in the door frame, the hook means are so anchored in the door that the carrier may not be stolen or otherwise removed as long as access to the interior of the car is barred.

Among the several objects of my invention are: the provision of an improved carrier which may be simply and easily constructed and quickly and securely positioned for use without requiring permanent attachment; to provide a carrier means for the "modern" automotive vehicle which will support fishing rods in a manner that will not materially interfere with the opening and closing of the doors and in a position where they will be less likely to be injured; and the provision of a carrier employing hooking means for securing the carrier over an upper edge of a window glass or the like, and which can be locked into the frame in which the glass is movable; and to provide in such a carrier a unique cradling arrangement whereby the normally thin and easily injured parts of a fishing rod are securely gripped for carrying effectively, but in such a manner as to preclude injury to the fishing rods, and yet the rods may be quickly and easily inserted or removed from the carrier with a minimum of time and skill.

Other advantages of the invention will be more apparent during the course of the following description, which, when taken in view of the accompanying drawings in which:

Fig. 1 is a fragmentary view in perspective of the upper portion of an automobile having my carrier installed thereon;

Fig. 2 is an enlarged perspective view of the carrier per se;

Figs. 3 and 4 are enlarged detailed views showing the manner in which a fishing rod is cradled in my carrier; and Fig. 5 is a fragmentary view in elevation showing a carrier frame and a bumper used in connection therewith.

Turning now to the drawing, my carrier in the preferred form includes a pair of spaced-apart arms adapted to be secured longitudinally along the side of the vehicle in spaced-apart relation. Each of the arms includes hook means for engaging the same to the window of the car and suitable leg and foot elements to form a portion of the supporting frame and an indented arch bar lying between a portion of the supporting frame and the indented arch bar lying between the foot and a portion of the leg in a manner that will support fishing rods in a desirable location. The arch bar is indented and overlying it is a pair of superimposed strap elements which are used in gripping the fishing rods.

As specifically shown in Fig. 2, the spaced-apart arms comprise: legs 10 each having a hook 12 at the upper end and an angularly disposed foot member 14 at the lower end. A slight outer riser 16 from the foot supports the outer end of the arch bar 18, which joins the leg at approximately a mid-position between its ends. Each of the arch bars 18 has a plurality of indentations 20 that are somewhat dentate in that between prominent protuberances is a depression or cavity that may be, as shown here, substantially arcuate, or could be more V-shaped.

The pairs of arms are joined, as is shown in Fig. 2, by means of cross ties 22, 23, 24 that are welded or otherwise secured at their ends to the indicated portions of the cross arms.

Adjacent each end of the arch bar and lying somewhat inward from the nearest adjacent protuberance by which the indentations are formed, is a swiveled square ring 28 and 30. The shape of rings 28 and 30 is relatively unimportant, and it will be obvious that other shapes may be used. The one end of the strap 32 is anchored to the square ring 28, and passes over the series of indentations 20 of the arch bar 18 and thence around the opposite ring 30 and returns upon itself in superimposed relation to be joined by the buckle 36. The overlapping layer of the strap I have indicated as 34. The protuberances between the depressions 20 I have indicated by the numerals 21. In Figs. 2, 3 and 4, when a small section, as in Fig. 3, of a fish rod is disposed between the straps 32 and 34 and over an indentation 20, the normal position of the straps will be somewhat distorted and the cradling action will be had for the rod in the indentation 20. As larger elements such as the handle or grip of the rod as shown in Fig. 4, are disposed between the straps, the tendency will be to more completely fill the indentation and relatively more distort the normal position of the straps 32 and 34. When the strap is properly tensioned by means of the buckle 36, a fairly secure grip is taken upon the rod or other element disposed between the straps, a grip of such an extent that the rod will not shift to any marked degree from its centering in the indentation, and under no circumstances will it jump out of place from one indentation to the next. It should be obvious that in the simplest form of the invention where it is only desired to carry one rod, but a single indentation with a pair of joining protuberances 21 would be used. However, for use by several persons I have shown the device in Fig. 2 to have four indentations whereby four rods could be easily carried in a single rack.

The square ring 30 constitutes a guide for the strap, and I have put a small roller 31 on the square ring, as is conventional in harness work, to facilitate the turning of the strap around the guide ring 30. By using the square rings 28 and 30 and by permitting them to swing slightly, adjustments and accommodations of the strap to the various shapes and sizes of rods that are placed therebetween is facilitated. In Fig. 5, I have illustrated the cushioning button 40 which is fastened to the back side of each of the legs 10 and will rest upon the window and prevent rattling and marring of the glass.

It is preferable that the hooks 12 be of such a size and arrangement that they will easily slip over the normal plate glass or safety glass of an automobile and will be thin enough that when the glass is raised into the groove in the upper part of the door frame, the hook will be disposed in the gasket that receives the glass and will be held tightly from moving in any direction. By mounting the carrier on the front door, preferably on the right hand side of the vehicle, and by positioning the outer ends of the rods in trailing relation so that the rod is principally gripped adjacent the handles, it is very easy to open the door and for a person to get in or get out of the automobile without having to remove the carrier therefrom.

Having thus described and illustrated my invention in one preferred form thereof, I wish it to be understood that the same is purely exemplary, and that the invention is not to be limited, but is to be construed within the spirit and scope of the appended claims.

I claim:

1. For mounting fishing rods and the like on automobiles, a carrier, comprising: means forming spaced apart arms to stand outward from the side of a vehicle in spaced apart relation longitudinally thereof, means for detachably securing said arms to a vehicle, each said arm having between its ends a U-shaped indentation formed therein with its mouth opening generally up and outward, said indentations of the arms being substantially aligned, a strap anchored to each arm to one side of the mouth of its indentation, means on the arm on the other side of the mouth of said indentation forming a strap guide, said strap anchor and strap guide being outside of said indentation and its mouth, said strap being passed from its anchor over said indentation thence past said guide means and in reverse in superpositioning to itself toward said anchor to grip a rod placed therebetween to cradle the same in the mouth of said indentation, and means for securing the superpositioned part of the strap in overlying and tensioned relationship over said indentation.

2. The structure according to claim 1, in which the arms each include a plurality of indentations in line and there are prominent shoulders between the indentations whereby several rods may be positioned in said carrier.

3. The structure according to claim 1, in which the strap guide is swingable about a pivot lying below the nearest edge of the adjacent notch.

4. The structure according to claim 1, in which the arms each include a plurality of arcuate indentations in line separated by relatively sharp protuberances therebetween whereby several rods may be positioned in said carrier.

5. For mounting fishing rods and the like on automobiles, a carrier, comprising: means forming a frame having hooks to engage over a window edge and depend on the exterior of the automobile, a pair of spaced apart arms mounted on said frame to stand out from the vehicle in parallelism, each said arm having an upward and outwardly open series of indentations in line and arranged in an arcuate manner, said indentations having at the ends and being separated by relatively sharp protuberances therebetween, a strap anchored outside one of each said series of indentations and below the adjacent end protuberance, means forming a swingable guide ring on the opposite end of said series with the axis of swing being below the adjacent protuberance at that end of said series, said strap being passed from its anchor over said openmouthed indentations in contact with said protuberances and past said guide means and thence in reverse in superpositioning to itself toward said anchored end to grip a rod placed therebetween to cradle the same in the mouth of one of said indentations, and quick-release means securing said strap end adjacent said anchored end in overlying and tensioned relationship over said indentations.

ANSEL COOKE.

REFERENCES CITED

The following references are of record in the file of this patent:

UNITED STATES PATENTS

| Number | Name | Date |
| --- | --- | --- |
| 1,575,023 | Walton | Mar. 2, 1926 |
| 1,970,962 | Hinckley | Aug. 21, 1934 |
| 2,171,053 | White | Aug. 29, 1939 |
| 2,235,012 | Colvin | Mar. 18, 1941 |
| 2,248,170 | Hansen | July 8, 1941 |
| 2,302,300 | Davies | Nov. 17, 1942 |
| 2,409,946 | MacTeod | Oct. 22, 1946 |
| 2,454,368 | Auskelis et al. | Nov. 23, 1948 |